US010713691B2

(12) United States Patent
Green (10) Patent No.: US 10,713,691 B2
(45) Date of Patent: Jul. 14, 2020

(54) CALIBRATING PACING OF A CONTENT CAMPAIGN

(71) Applicant: Facebook, Inc., Menlo Park, CA (US)

(72) Inventor: Perry Aaron Green, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 251 days.

(21) Appl. No.: 15/700,125

(22) Filed: Sep. 9, 2017

(65) Prior Publication Data

US 2019/0080361 A1 Mar. 14, 2019

(51) Int. Cl.
*G06Q 30/02* (2012.01)
*G06Q 10/06* (2012.01)

(52) U.S. Cl.
CPC ... *G06Q 30/0275* (2013.01); *G06Q 10/06312* (2013.01); *G06Q 10/06316* (2013.01); *G06Q 30/0244* (2013.01); *G06Q 30/0249* (2013.01)

(58) Field of Classification Search
CPC .......... G06Q 30/0275; G06Q 30/0244; G06Q 30/0249
See application file for complete search history.

(56) References Cited

U.S. PATENT DOCUMENTS

| 2015/0112795 A1* | 4/2015 | Jalali ............... G06Q 30/0249 705/14.48 |
| 2015/0206170 A1* | 7/2015 | Karande ........... G06Q 30/0242 705/14.41 |
| 2015/0213488 A1* | 7/2015 | Karande ........... G06Q 30/0249 705/14.45 |
| 2017/0116645 A1* | 4/2017 | Bishop .............. G06Q 30/0277 |
| 2018/0101872 A1* | 4/2018 | Mongeau ........... G06Q 30/0249 |

* cited by examiner

*Primary Examiner* — Mario C. Iosif
(74) *Attorney, Agent, or Firm* — Fenwick & West LLP (57) ABSTRACT

A sponsor specifies a content campaign along with a budget, a duration, a maximum bid value and one or more objectives associated with the content campaign. An online system presenting the sponsored content calibrates the pacing factor of the content campaign to present the sponsored content evenly throughout the specified duration of the campaign. Paced bids are provided for the content campaign to compete for placement in opportunities during a ramp-up period, in which the paced bid associated with the campaign is adjusted to the maximum bid value. The target-ramp up period is iteratively determined as the current paced bid approaches the maximum bid value to avoid overspending the budget early in the campaign. When a conversion event occurs, the ramp-up period ends and the content campaign transitions to a normal pacing algorithm.

12 Claims, 4 Drawing Sheets

CALIBRATING PACING OF A CONTENT CAMPAIGN

BACKGROUND

This disclosure relates generally to online content campaigns, and more specifically to calibrating the pacing of online content.

When initiating content campaigns to present content to users of an online system, a sponsor may specify a budget to be spend over a time period. The sponsor's content competes with other content sponsors for presentation to users, and portions of the budget may be allocated compete with other sponsors in an auction. To adjust the amount of the budget that is bid in a given placement opportunity, a pacing factor adjusts the actual bid upwards or downwards to increase or decrease the likelihood of winning the auction (and spending the campaign budget). The pacing factor may be applied to a maximum bid amount to determine the auction bid used in the auction.

Initially, a content sponsor may not know a pacing factor to successfully place advertisements at a rate consistent with the desired budget and time period. The pacing factor may impact the spending rate of the content campaign, resulting in over- or under-spending the specified budget when poorly selected. When the pacing factor is too high, the content campaign may win too many auctions early in the time period for the campaign and at a higher value. When the pacing factor is too low, time lapses in the time period for which no spending occurs, reducing the effective time period for the campaign and losing the opportunity to place content in the initial portion of the campaign's time period.

When determining the initial pacing factor, the pacing factor may be increased until the campaign successfully wins an auction and the content is presented to users. While increasing the pacing, overshooting a pacing factor that generates the desired spending rate may also be problematic because there may be a delay between the selection of the content (in winning the auction) and determining that the budget has been spent for the campaign. For example, the content may be selected for a user but the content may never be delivered to the user. In additional cases, the budget for the campaign may not be spent until a later conversion event occurs, such as a user interacting with the content or interacting with a sponsor's webpage. If the pacing factor is increased too quickly while those events can still occur, if those events do occur it may trigger significant overspending of the budget early in the time period for the campaign.

SUMMARY

An online system calibrates the pacing factor of content in a content campaign during a flexible ramp-up period to determine a pacing factor consistent with the desired spending rate of the campaign. The ramp-up period is an initial portion of the time period for the campaign in which the pacing factor is increased until the campaign begins winning auctions and the budget begins being spent. The budget may be spent when the campaign wins the auction or may be triggered by a later conversion event. The ramp-up period thus may be used to determine an initial pacing factor for the campaign at which the campaign may win auctions.

While the campaign is active, opportunities to place the advertisement are received by the online system and the campaign may bid for placement. During the ramp-up period, the pacing factor is increased to the maximum bid amount. Rather than set a defined time for the ramp-up period, the ramp-up period is determined based on the budget for the advertisement and a current bid amount. A ratio of the bid to the current budget is determined and represents the portion of the time period in which that amount of the budget may be spent. For example, a bid of $1 to a $100 budget (a 1:100 ratio) suggests that to reach the desired campaign budget over time, the bid amount should be spent 100 times during that time period. The expected ramp-up time (the time to first conversion) may thus be set as a time that permits that spending frequency. The ramp-up time may be set as the total time period multiplied by the ratio of current bid (as determined by the current pacing factor) to the budget for the campaign. Thus, as the pacing factor increases, the amount of time expected to spend a bid amount increases accordingly.

To determine the pacing factor, a target ramp-up time is determined for an initial bid amount and adjusted iteratively as the current bid amount is increased to the maximum bid amount specified for the campaign. The iterative adjustment is based on the maximum bid and the budget of the campaign, the time period of the campaign, and the current pacing factor associated with the content. As the current bid amount increases, the online system continually determines opportunities for the content to be presented to users of the online system, and submits the content in auctions to compete with other content for placement in the opportunity. Because the bid amount increases iteratively along a non-linear path to the maximum bid amount, the iterative adjustment ensures that the bid amount and pacing factor at the beginning of a campaign does not consume a significant amount of budget while still providing a quick ramp-up period to the first conversion consistent with the implied number of times the conversion should occur given the bid.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
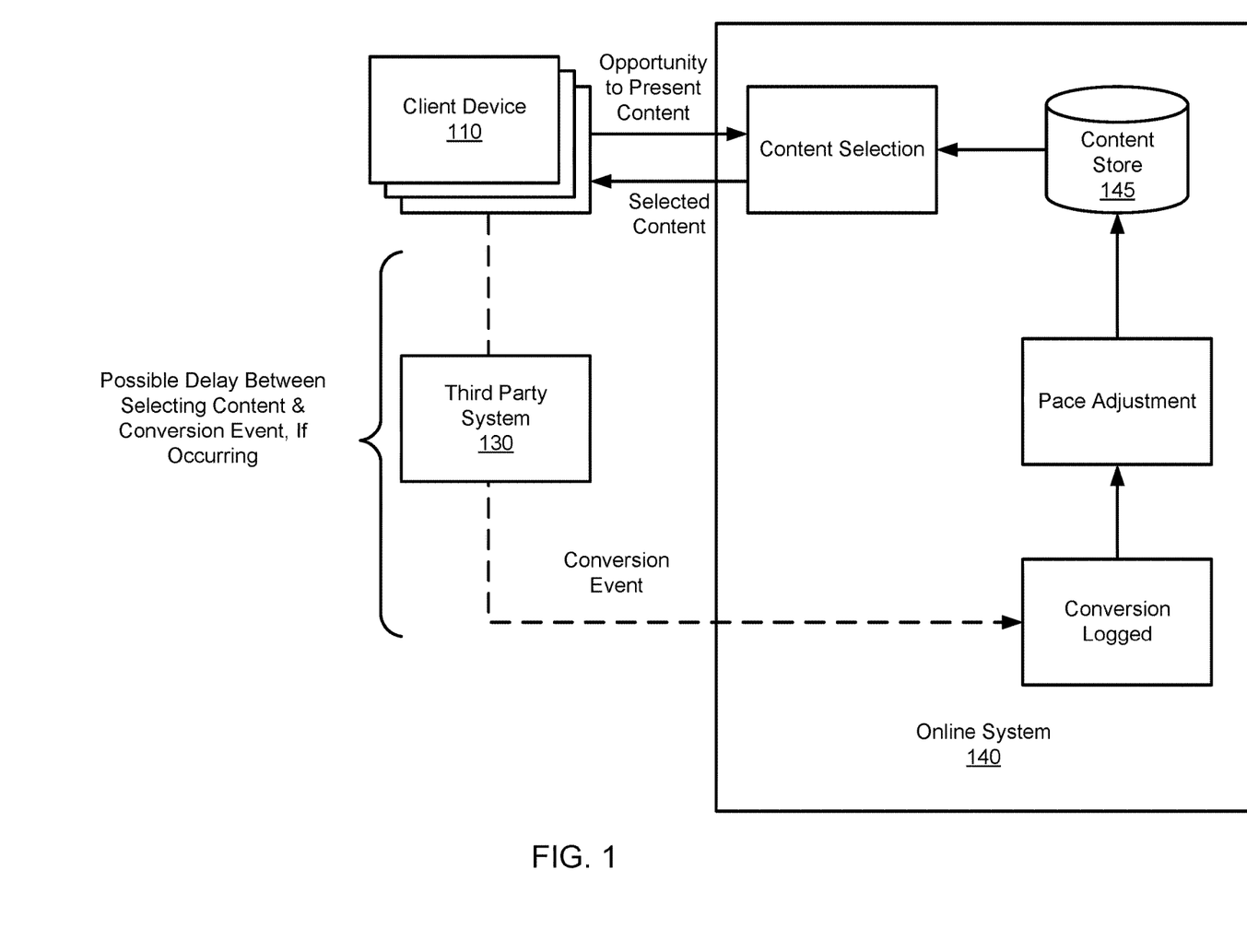
FIG. 1 is an overview of a system for adjusting a pacing factor for a sponsored content campaign to be presented to users of an online system, in accordance with an embodiment.

FIG. 1 is an overview of a system for adjusting a pacing factor for a sponsored content campaign to be presented to users of an online system 140. The pacing factor (or "pacing") may affect the rate at which the content is selected for presentation to users by adjusting the value associated with the content in selecting the content for users. Adjusting the pacing factor may increase or decrease the frequency that the content auction is selected and thereby affect the spending rate of the campaign. Additionally, adjusting the pacing factor of presentation of content from the content campaign allows a sponsor to modify the number of conversions associated with the content or the number of distinct users of the online system presented with content from the content campaign, increasing the effectiveness of the content campaign. As used herein, a "conversion" indicates an action taken by the user of the online system presented the content that triggers the budget being spent, such as a view, a click, or a purchase of a product associated with the content. For example, a campaign may designate a desired action as a user interacting with the content and accessing the third-party system, in which case the budget associated with that campaign may not be spent until that interaction occurs.

FIG. 1 illustrates an example flow for pacing this content. This environment includes an online system 140 that communicates externally with one or more client devices 110 and one or more third party systems 130.

The online system 140 includes a content store 145 including content campaigns provided to the online system 140 by external or internal sponsors. When specifying a content campaign, a sponsor identifies different properties, or characteristics, of the content campaign. For example, the sponsor specifies a budget associated with the content campaign that specifies the total amount of compensation the sponsor is willing to provide an online system for presentation of content in the content campaign. Additionally, a duration may be associated with the content campaign specifying a length of time during which content from the content campaign is presented to online system users. The sponsor may also specify one or more objectives for the content campaign. For example, a conversion objective specifying a number of conversions from the content campaign is associated with the content campaign. Additional objectives may also be associated with the advertising campaign, such as an impression objective specifying a number of impressions of content from the content campaign and a reach objective specifying a number of different users presented with content from the content campaign.

Additionally, a sponsor may associate targeting criteria with a content campaign specifying one or more characteristics of users eligible to be presented with content included in the content campaign. Bid amounts are associated with various content items in the content campaign that specify an amount of compensation a sponsor provides an online system for presenting content, for an online system user interacting with the content, or for another specified criteria occurring, such as the objective. In various embodiments, bid amounts are determined for content in the content campaign based on a pacing factor calculated for the content campaign. As the pacing factor is adjusted by the online system 140, the adjusted pacing factor may be stored in association with the content campaign in the content store 145.

The one or more client devices 110 communicate opportunities to present content to the online system 140. Information on the online system user may be associated with the opportunities to present content, such as online system user demographics, interests, relationships, and other information that may be used as targeting criteria.

The content selection process receives one or more content items from the content campaign store based on information associated with the opportunity to present content and targeting criteria associated with the content items, and selects content from the one or more content items to present to the client devices 110. In some embodiments, the content selection process comprises an auction in which content items are ranked based on an associated bid amount. The bid amount used in the auction may be based on the value associated with the objective, a predicted likelihood the user will perform the action associated with the objective, and the pacing value. Content items may be selected for presentation based on their position within the ranking or based on a minimum threshold value, and upon selection are received by the client device 110 for presentation.

The client devices 110 may communicate to a third party system 130 associated with selected content after the selected content has been presented and an online system user interacts with the content. For example, an online system user may click to a third party site, download an application sponsored by the third party, purchase a product sponsored by the third party, or take another action associated with the content presented by the online system 140. In this example, the interaction with the third party application may be the objective of the campaign. Because this conversion event may or may not occur based on the user's interaction with the client device 110, a time delay may occur between the content selection process and a conversion event, or a conversion event may not occur. Conversion events are communicated to the online system 140 to be logged when they occur, and the pacing factor of the content campaign is adjusted based on the budget and time period associated with the content campaign and the current budget associated with the content campaign. For example, conversion events logged at a rate that will exhaust the budget associated with the content campaign before the time period associated with the content campaign ends may result in the pacing factor adjusted downward, causing the modified bid value to decrease and less auctions to be won. In another example, if conversion events are logged at a rate at which the budget associated with the content campaign will not be exhausted before the time period associated with the content campaign ends, the pacing factor is adjusted upward, causing the modified bid value to increase and more auctions to be won.

System Architecture

Figure 2:
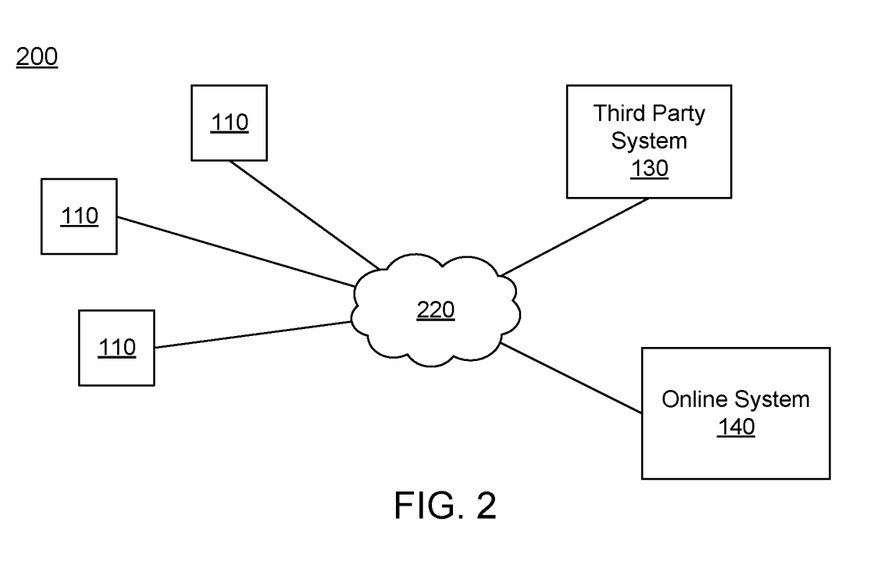
FIG. 2 is a block diagram of a system environment for an online system, in accordance with an embodiment.

FIG. 2 is a block diagram of a system environment 200 for an online system 140. The system environment 200 shown by FIG. 2 comprises one or more client devices 110, a network 220, one or more third-party systems 130, and the online system 140. In alternative configurations, different and/or additional components may be included in the system environment 200.

The client devices 110 are one or more computing devices capable of receiving user input as well as transmitting and/or receiving data via the network 220. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 220. In one embodiment, a client device 110 executes an application allowing a user of the client device 110 to interact with the online system 140. For example, a client device 110 executes a browser application to enable interaction between the client device 110 and the online system 140 via the network 220. In another embodiment, a client device 110 interacts with the online system 140 through an application programming interface (API) running on a native operating system of the client device 110, such as IOS® or ANDROID™.

The client devices 110 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 130 may be coupled to the network 220 for communicating with the online system 140, which is further described below in conjunction with FIG. 3. In one embodiment, a third party system 130 is an application provider communicating information describing applications for execution by a client device 210 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 3:
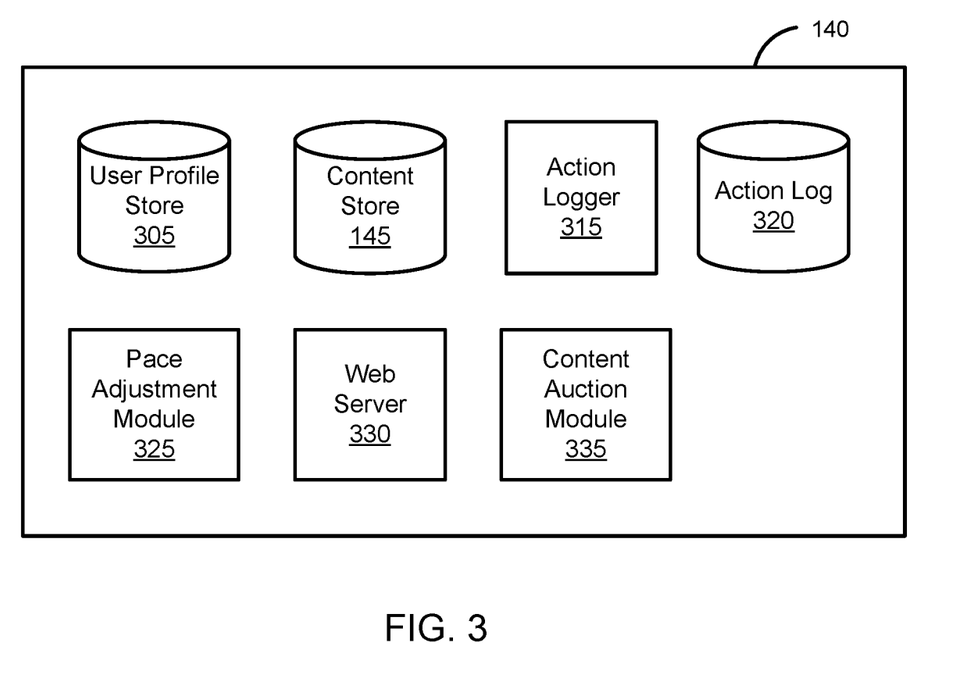
FIG. 3 is a block diagram of an architecture of the online system, in accordance with an embodiment.

FIG. 3 is a block diagram of an architecture of the online system 140. The social networking system 140 shown in FIG. 3 includes a user profile store 305, a content store 145, an action logger 315, an action log 320, a pace adjustment module 325, a web server 330, and a content auction module 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared about the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location, and the like. A user profile may also store other information provided by the user, for example, images and videos. In certain embodiments, images of users may be tagged with information identifying the online system users displayed in an image. A user profile in the user profile store 305 may also maintain references to actions by the corresponding user performed on content items in the content store 145 and stored in the action log 320.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 145 stores objects in which each object may represent various types of content. Examples of content represented by an object include a page post, a status update, a photograph, a video, a link, a shared content item, a gaming application achievement, a check-in event at a local business, a brand page, or any other type of content. Online system users may create objects stored by the content store 145, such as status updates, photos tagged by users to be associated with other objects in the online system, events, groups or applications.

In some embodiments, objects may be sponsored content received from internal or external sponsors. Externally sponsored objects are received from third-party applications or third-party applications separate from the online system 140. Internally sponsored objects can promote engagement with the online system 140 or other interactions beneficial to the system, and can have a value that is not represented in monetary payment to the online system 140. Sponsored objects may be associated with content campaigns, wherein a content campaign includes one or more sponsored objects, and is further associated with one or more objectives, a budget, and a time period. As described above in conjunction with FIG. 1, an objective associated with a content campaign describes one or more goals for actions associated with the content campaign. The budget specifies a total amount of compensation a sponsor associated with a content campaign provides the online system 140 for presenting content in the content campaign or for the online system 140 receiving interactions with content in the content campaign. The time period associated with the content campaign specifies a time interval during which content from the content campaign is presented to online system users. For example, if the duration of the content campaign is 30 days, content included in the content campaign is presented to online system users for 30 days after the content campaign is provided to the online system 140. In some embodiments, the sponsor may also specify a start date for the content campaign, so the time period is measured from the specified start date.

Sponsored content campaigns include one or more content objects that describe content in the content campaign for presentation to one or more online system users. A content request includes sponsored content, which is text, image, audio, video, or any other suitable data presented to a user. In various embodiments, the sponsored content is associated with a network address specifying a landing page, or other destination, to which a user is directed when the content is accessed. Additionally, sponsored content may be associated with one or more targeting criteria specified by the sponsor. Targeting criteria included in a content request specify one or more characteristics of users eligible to be presented with content associated with the content request. For example, targeting criteria are used to identify users having user profile information, edges, or actions satisfying at least one of the targeting criteria. Hence, targeting criteria allow a sponsor to identify users having specific characteristics, simplifying subsequent distribution of content to different users. Additionally, targeting criteria may be associated with a content campaign in its entirety, so multiple content items in the advertising campaign are eligible to users having characteristics satisfying one or more of the targeting criteria associated with the content campaign.

In another embodiment, objects in the content store 145 represent single pieces of content, or content "items." Hence, 2 online system users are encouraged to communicate with each other by posting text and content items of various types of media to the online system 140 through various communication channels. This increases the amount of interaction of users with each other and increases the frequency with which users interact within the online system 140.

The action logger 315 receives communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition to logging actions on normal SNS content, the action logger 315 populates the action log 320 with information on user actions with sponsored content. Examples of actions on sponsored content include external verification of clicks, purchases, conversions, and the like. In addition, a number of actions may involve an object and one or more particular users, so these actions are associated with those users as well and stored in the action log 320.

The action log 320 may be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a mobile device, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying.

The action log 320 also stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The action log 320 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the action log 320, in one embodiment. Alternatively, each interaction between a user and a specific object is stored as a separate edge. In some embodiments, connections between users may be stored in the user profile store 305, or the user profile store 305 may access the action log 320 to determine connections between users.

The pace adjustment module 325 regulates presentation of content from content campaigns to online system users so that an objective associated with the content campaign is satisfied throughout the time period associated with the content campaign. The pace adjustment module 325 adjusts the pacing during the content campaign based on the current spending of the campaign and the amount of time remaining in the campaign by adjusting a pacing factor for the campaign. The pacing factor adjusts a value for the campaign and is applied to auctions for opportunities to present content from the content campaign. In various embodiments, content campaigns or content objects in content campaigns are associated with a maximum bid amount or value for an action associated with the campaign, which may be scaled by the pacing factor to determine an effective bid for the content selection. In one embodiment, the pace adjustment module 325 determines a pacing factor that determines bid amounts associated with content from a content campaign during an interval of the content campaign's duration. For example, the pace adjustment module 325 determines a pacing factor from the budget associated with the content campaign and an amount spent by a sponsor on the content campaign from a start date of the content campaign to a current time. The pace adjustment module 325 modifies the bid amount associated with one or more content objects in the content campaign based on the pacing factor. For example, bid amounts associated with one or more content objects in the content campaign are multiplied by the pacing factor, with the product used as the bid amounts associated with the content during an interval of the content campaign's duration. The pacing factor may be modified at various intervals, allowing the pace adjustment module 325 to modify how the content campaign's budget is used throughout the content campaign's duration.

The web server 330 links the online system 140 via the network 220 to the one or more client devices 110, as well as to the one or more third party systems 130. The web server 330 serves web pages, as well as other content, such as JAVA®, FLASH®, XML and so forth. The web server 330 may receive and route messages between the social networking system 140 and the client device 110, for example, instant messages, queued messages (e.g., email), text messages, short message service (SMS) messages, or messages sent using any other suitable messaging technique. A user may send a request to the web server 330 to upload information (e.g., images or videos) that are stored in the content store 145. Additionally, the web server 330 may provide application programming interface (API) functionality to send data directly to native client device operating systems, such as IOS®, ANDROID™, WEBOS® or BlackberryOS.

The content auction module 335 receives content from one or more content campaigns and ranks the received content based on their associated bid amounts when an opportunity to present content is identified. The content auction module may also determine the bid amounts for the content campaigns. For example, the content auction module 335 ranks the received advertisements based on their associated expected values, which are based at least in part on the bid amounts associated with the content, where content associated with larger expected values have a higher position in the ranking. To determine the bid amounts, the content auction module may apply predictive models of user behavior to determine the user's expected likelihood of performing the action associated with a campaign, as well as applying the pacing factor to the designated value (or maximum value) for that action. The content auction module selects one or more content items based on the ranking, and the selected content is presented to an online system user. For example, the content auction module 335 selects content having the highest position in the ranking or having at least a threshold position in the ranking. In other embodiments, the content auction module 335 may use any other suitable method to select content for presentation to an online system user.

Calibrating Pacing of a Content Campaign

Figure 4A:
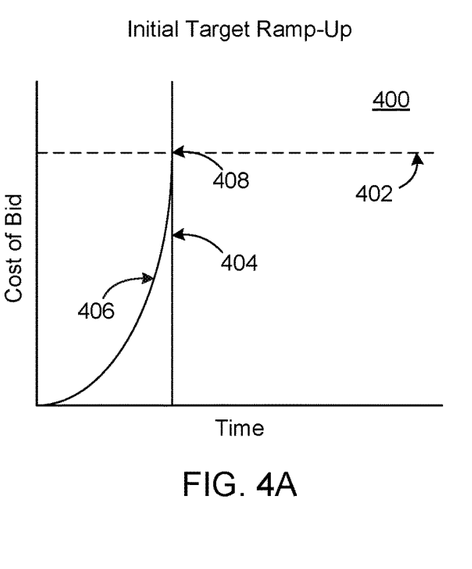
FIG. 4A-4D are examples illustrating paths for calibrating the pacing factor of content campaigns during an initial ramp-up period, in accordance with an embodiment.

FIG. 4A-4D are examples illustrating paths for calibrating the pacing factor of content campaigns during an initial ramp-up period. When a content campaign is initially presented, a pacing value that would effectively present the content item consistent with the desired spending rate of the campaign may be unknown. A ramp-up period as shown in FIGS. 4A-4D may be used to determine the initial pacing factor for the campaign in a way that avoids over or under-spending of the budget. FIG. 4A illustrates an initial target ramp-up period 400, wherein a path 406 is determined from an initial bid amount at the start of the ramp-up period to the maximum bid value 402 at the initial target ramp-up time 406. Using the maximum bid value 402, the path 406 provides a function that increases the pacing factor for the campaign until the maximum bid value 402 is reached. Over time as the campaign competes for content, the path 406 designates the subsequent values to increase the pacing factor. The maximum bid value 402 may be specified by a sponsor at the time that the content campaign is received, or may be determined by the online system 140. In some embodiments, the path 406 from the current bid and time to the maximum bid value 402 at the target ramp-up time 406 is non-linear, such that as the bid value approaches the maximum bid value 402, the rate at which the bid value changes increases.

To determine the ramp-up time 400 and path 406, the ramp-up time may be determined based on a current pacing value. The ramp-up time may be dynamically determined based on the budget and the pacing factor by considering the number of times that the campaign may successfully generate a conversion given that pacing factor. To determine this value, the maximum bid (maximum value for the campaign) may be multiplied by the pacing factor, and divided by the budget, and multiplied by the time period for the campaign.

$$T_r = \frac{V_m * P}{B} * T \qquad \text{Equation 1}$$

As one example shown in Equation 1, the ramp-up time $T_r$ may be computed as the maximum value $V_m$ multiplied by the pacing factor P, and divided by the budget for the campaign B (together defining a bid to budget ratio), multiplied by the time period T for the campaign.

In this way, a ratio of the bid to the current budget is determined and represents the portion of the time period in which that amount of the budget may be spent. For example, a maximum bid of $10, multiplied by a pacing factor of 0.1 for a $100 budget yields a 1:100 bid-budget ratio bid of $1 to a $100 budget (a 1:100 ratio) suggests that to reach the desired campaign budget over time, the bid amount should be spent 100 times during that time period. Applying the example formula of Equation 1, the ramp-up period for a time period T for the campaign of 24-hour (1440 minutes) at this 1:100 ratio would be set at 14.4 minutes.

In some embodiments, the pacing factor initially be set low, such as a value of 0.001, or 0.0001. In this case, the bid:budget ratio may be very small, and suggest a short ramp-up time in the order or minutes or seconds. Using this short-ramp-up time may risk a ramp-up to the maximum bid value quickly if the ramp-up time is not re-evaluated as discussed below. To address this circumstance, in some embodiments, an initial target ramp-up time 406 is used that may be a fixed time period such as 10 minutes that subsequently transitions to an iteratively determined target ramp-up time based on the current bid, the budget of the content campaign, and the duration of the content campaign. The target ramp-up time may be selected as the greater of the fixed time period or the ramp-up time determined based on the bid:budget ratio.

Figure 4B:
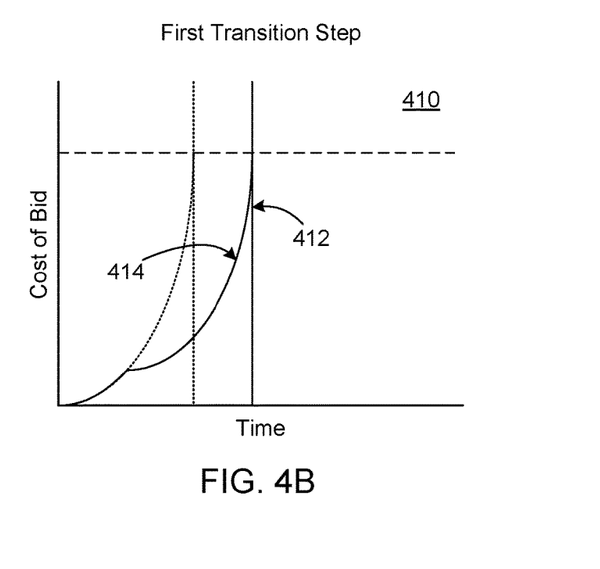
Figure 4C:
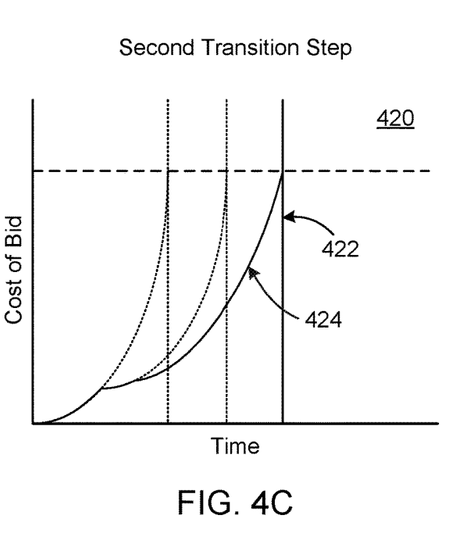

After determining the ramp-up period 404, the point 408 at which the maximum value is reached at the time period may be used to determine the path 406. In some embodiments, the path 406 is determined based on a function to reach the point 408 from the current pacing factor. The function may be, for example, a non-linear function such as an exponential curve that fits the nonlinear function between the current point in time and the ramp-up period. As time progresses, the pacing factor may be increased along the path 406 until the ad campaign begins to successfully win auctions and budget expenses are triggered. As shown in FIGS. 4B and 4C, as time progresses, the ramp-up period may be re-evaluated as the current bid increases and the bid:budget ratio changes.

FIG. 4B illustrates a first transition step 410 during the ramp-up period. After an amount of time, such as a determined step value (e.g., 1, 5, or 10 minutes), an adjusted path 414 is calculated to iteratively determine an adjusted ramp-up time and path based on the current bid:budget ratio. This may adjust the current bid amount to the maximum bid value 402 using an adjusted target ramp-up time 412. The adjusted target ramp-up time 412 is determined based on the current bid value, the budget of the content campaign, and the time period of the content campaign.

FIG. 4C illustrates a second transition step 420 during the ramp-up period. At a second determined step value, a second adjusted path 424 is calculated from a current bid amount to the maximum bid value 402 at a second adjusted target ramp-up time 422. The second adjusted target ramp-up time is determined based on the updated current bid value, the budget of the content campaign, and the time period of the content campaign. The process of iteratively determining transition steps and adjusting the path from the current bid to the maximum bid value at an adjusted target ramp-up time may continue until either the maximum bid value 502 is achieved or a conversion event is logged.

Figure 4D:
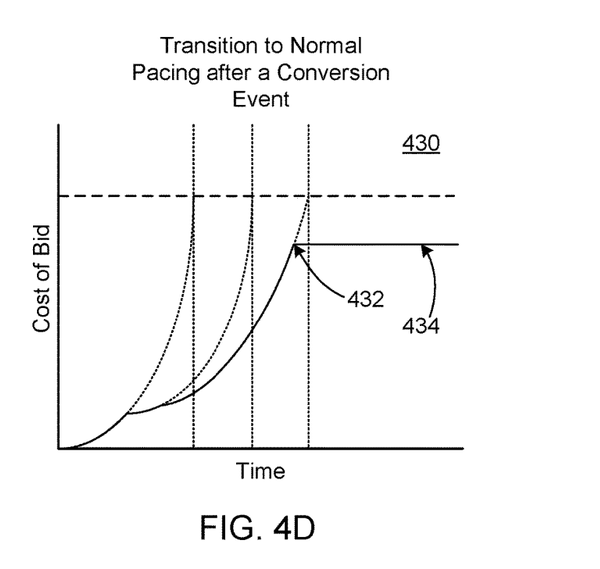

FIG. 4D illustrates a transition to normal pacing after a conversion event occurs 430. A conversion event 432 occurs when the budget associated with the content campaign begins to be spent. This may be triggered by the content winning an auction for selecting sponsored content for presentation to an online system user, the online system user interacting with presented content, or another action associated with the sponsored content. After a conversion event 432 is logged, the ramp-up period ends and the content campaign transitions to a normal pacing algorithm 534. A ramp-up period may end prior to reaching the target ramp-up time or the maximum bid value 502.

Figure 5:
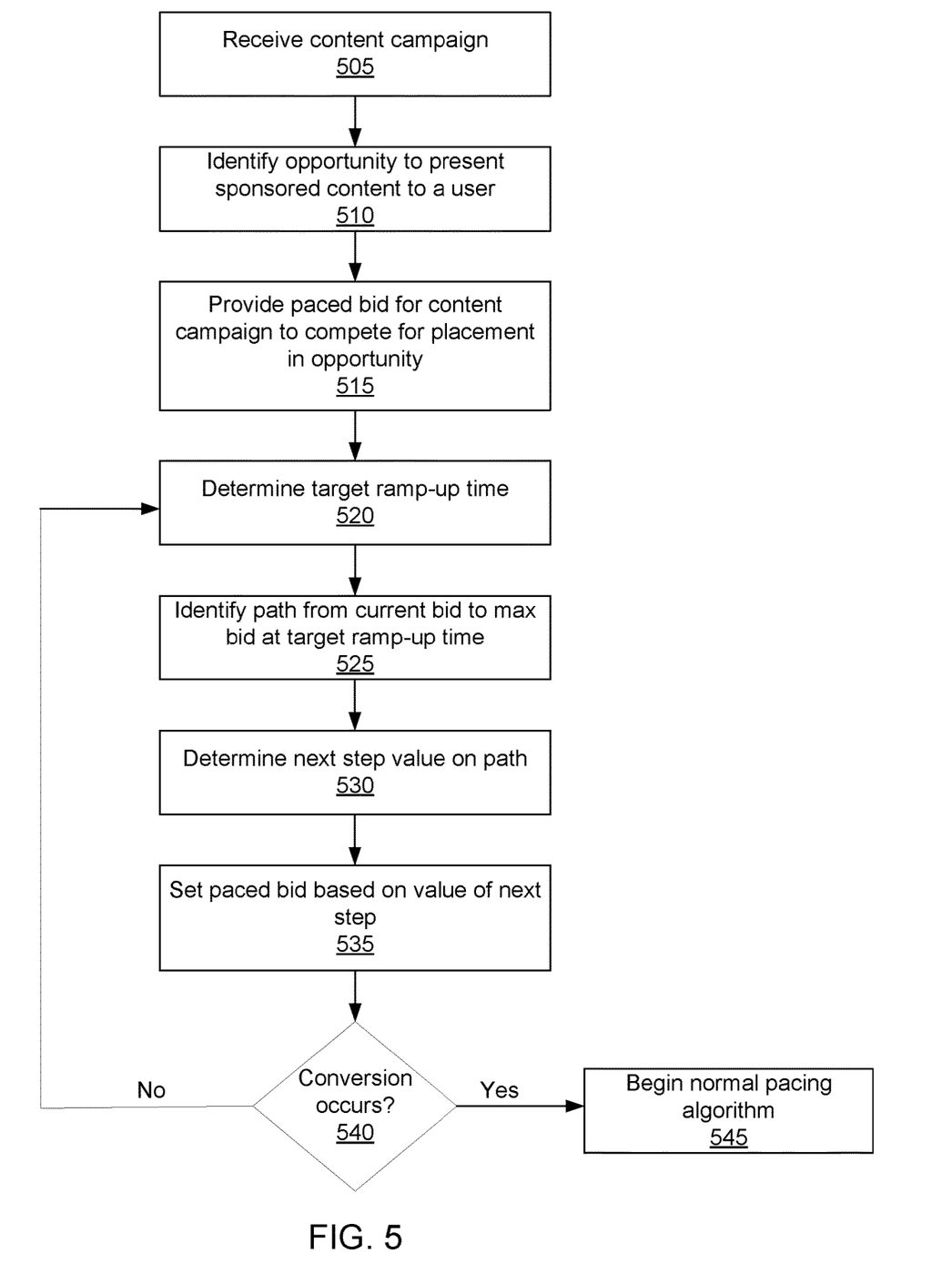
FIG. 5 is a flow diagram of a method for calibrating the pacing factor of a content campaign, in accordance with an embodiment.

FIG. 5 is a flow diagram of a method for calibrating the pacing factor of a content campaign. In various embodiments, the method may include different and/or additional steps than those described in conjunction with FIG. 5.

An online system 140 receives a content campaign 505 including a budget, a time period, and a maximum bid amount. The content campaign may further include one or more objectives, targeting criteria, or other information associated with the content in the content campaign. To determine a pacing factor for the content campaign to spend the budget associated with the content campaign evenly over the time period of the content campaign, the content campaign is calibrated using a ramp-up period. During the time period of the campaign and while the budget is unspent, the online system 140 identifies opportunities to present sponsored content 510 from the content campaign to online system users using information associated with the content campaign, starting at an initial bid value lower than the maximum bid value. When an opportunity to present sponsored content is identified, the online system 140 provides a paced bid 515 for the content campaign to compete for placement in the opportunity. The paced bid can then be calibrated for the content campaign using the opportunities for content placement until a conversion event occurs.

Calibration of the paced bid comprises first determining a target ramp-up time 520 based on the value of the current bid, the budget associated with the content campaign, and the time period of the content campaign. A path is identified 525 from the current bid at the current time to the maximum bid at the target ramp-up time. The path is determined as a function that transitions the current bid value to the maximum bid amount during the target ramp-up time. Based on the path, a next step value is determined 530 and is used to determine the point on the path at which the next iteration of calibration occurs. The online system 140 sets a paced bid 535 based on the value of the next step, which is then used to bid in opportunities to place the sponsored content.

The process iterates until a conversion event occurs, where the ramp-up time is adjusted at the start of each iteration and the adjusted paced bid is submitted to opportunities for content placement until a conversion occurs. When a conversion event occurs, the online system 140 transitions the content campaign to a normal pacing algorithm 545 and ends the ramp-up period of the content campaign.

In another embodiment, if no conversion event occurs before the maximum bid amount is reached, the content campaign may transition to a normal pacing algorithm when the maximum bid value is reached.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a content campaign including a budget, a time period, and a maximum bid amount;
determining an initial pacing factor for a ramp-up period of the content campaign;
during the ramp-up period and while the budget is unspent, identifying an opportunity to present content to a user targeted by the content campaign;
providing a paced bid for the content campaign to compete with other content for placement in the opportunity, the paced bid determined based on the pacing factor and the maximum bid amount;
calibrating the initial pacing factor for the content campaign during the ramp-up period, until a conversion event occurs, by at least once iteratively:
determining a target ramp-up time based on a ratio of the paced bid to the budget at a current time and time period of the content campaign;
identifying a non-linear path from the paced bid at the current time to the maximum bid amount at the target ramp-up time, the non-linear path providing a function transitioning the current paced bid at the current time to the maximum bid amount during the target ramp-up period;
determining a next step value on the path, the next step value used to determine the point on the path at which the next iteration begins;
updating the paced bid based on the next step value and the path; and
when the conversion event occurs, setting the initial pacing factor for the remaining portion of the time period based on the updated paced bid.

2. The method of claim 1, wherein calibrating the calibration pacing factor during the ramp up period further comprises:
setting the target ramp-up time to a fixed time;
responsive to the current time reaching a transition time within the ramp-up period, at least once iteratively setting the target ramp-up time based on the ratio of the paced bid to the budget at the current time and time period of the content campaign.

3. The method of claim 2, wherein the transition time is the time at which the target ramp-up time based on the ratio of the paced bid to the budget at the current time and time period of the content campaign exceeds the fixed time.

4. The method of claim 1, wherein the target ramp-up time based on a ratio of the paced bid to the budget at the current time and time period of the campaign is determined according to a desired conversion rate to spend the budget of the campaign evenly throughout the time period of the campaign.

5. The method of claim 4, wherein the target ramp-up time is calculated multiplicatively using the maximum ratio of the paced bid to the budget at the current time and the time period of the campaign.

6. The method of claim 1, wherein the slope of the non-linear path increases over the ramp-up period.

7. A computer program product for calibrating a pacing factor of a content campaign to find a value in which, relative to a maximum bid, conversion events occur, the computer program product comprising a non-transitory computer-readable storage medium containing computer program code for:
receiving a content campaign including a budget, a time period, and a maximum bid amount;
determining an initial pacing factor for a ramp-up period of the content campaign;
during the ramp-up period and while the budget is unspent, identifying an opportunity to present content to a user targeted by the content campaign;
providing a paced bid for the content campaign to compete with other content for placement in the opportunity, the paced bid determined based on the pacing factor and the maximum bid amount;
calibrating the initial pacing factor for the content campaign during the ramp-up period, until a conversion event occurs, by at least once iteratively:
determining a target ramp-up time based on a ratio of the paced bid to the budget at a current time and time period of the content campaign;
identifying a non-linear path from the paced bid at the current time to the maximum bid amount at the target ramp-up time, the non-linear path providing a function transitioning the current paced bid at the current time to the maximum bid amount during the target ramp-up period;
determining a next step value on the path, the next step value used to determine the point on the path at which the next iteration begins;
updating the paced bid based on the next step value and the path; and
when the conversion event occurs, setting the initial pacing factor for the remaining portion of the time period based on the updated paced bid.

8. The computer program product of claim 7, wherein calibrating the calibration pacing factor during the ramp up period further comprises:
setting the target ramp-up time to a fixed time;

responsive to the current time reaching a transition time within the ramp-up period, at least once iteratively setting the target ramp-up time based on the ratio of the paced bid to the budget at the current time and time period of the content campaign.

9. The computer program product of claim 8, wherein the transition time is the time at which the target ramp-up time based on the ratio of the paced bid to the budget at the current time and time period of the content campaign exceeds the fixed time.

10. The computer program product of claim 7, wherein the target ramp-up time based on a ratio of the paced bid to the budget at the current time and time period of the campaign is determined according to a desired conversion rate to spend the budget of the campaign evenly throughout the time period of the campaign.

11. The computer program product of claim 10, wherein the target ramp-up time is calculated multiplicatively using the maximum ratio of the paced bid to the budget at the current time and the time period of the campaign.

12. The computer program product of claim 7, wherein the slope of the non-linear path increases over the ramp-up period.

* * * * *